United States Patent Office 3,676,145

Patented July 11, 1972

3,676,145
PREDETERMINED CHEMICAL REACTIONS IN PHOTOGRAPHIC IMAGEWISE CONFIGURATION

Thomas F. Protzman, Worthington, Ohio, assignor to A. E. Staley Manufacuring Company, Decatur, Ill.

No Drawing. Filed Sept. 21, 1970, Ser. No. 74,119
Int. Cl. G03c 1/68, 5/00
U.S. Cl. 96—115 23 Claims

ABSTRACT OF THE DISCLOSURE

Process for carrying out a predetermined chemical reaction in imagewise configuration which comprises exposing an element comprising (A) a first solid layer comprising a composition capable of undergoing a predetermined chemical reaction bearing (B) a second layer comprising a composition capable of receiving a powder in image-wise configuration to actinic radiation to form a latent powder-receptive image without initiating said predetermined chemical reaction; developing said latent image with powder particles comprising a complementary reagent which, in minor proportions, exerts a major influence on the course of said predetermined chemical reaction to form a layer of powder particles in image-wise configuration; bringing said complementary reagent into reactive contact with said composition capable of undergoing said predetermined chemical reaction; and carrying out said predetermined chemical reaction in a predetermined configuration conforming to the image-wise configuration of the powder particles of said second layer.

This invention relates to a process wherein (1) an element comprising (A) a first solid layer comprising a composition capable of undergoing a predetermined chemical reaction bearing (B) a second layer comprising a light-sensitive layer capable of developing a $R_d$ of 0.2 to 2.2, is exposed to actinic radiation to develop a potential $R_d$ of 0.2 to 2.2 without initiating said predetermined chemical reaction, (2) said light-sensitive layer is developed with a powder particle comprising a component which, in minor proportion, exerts a major influence on the course of said predetremined chemical reaction and (3) said predetermined chemical reaction is carried out in a predetermined configuration conforming to the image-wise configuration of the powder particles of said second layer.

There are numerous situations where it is desirable to carry out a predetermined chemical reaction over predetermined parts of an object or substrate to impart a decorative or functional surface to said object. For example, some predetermined chemical reactions are use to prepare printing plates, printed circuits, etc. In other cases, it may be desirable to apply a mat, grained, embossed, engraved or etched surface to an object. In general, the prior art processes, by their very nature, are limited to those where said predetermined chemical reaction is controlled directly by the composition's response to actinic radiation. In other words, the composition capable of undergoing said predetermined chemical reaction must be light-sensitive.

This superimposes various requirements on the composition capable of undergoing the predetermined chemical reaction which is not relatable to the functional or decorative effect desired. For example, photopolymerizable compositions must be compounded in a manner such that they are polymerizable only in the irradiated areas. Accordingly, the polymerizable composition must have some thermal stability (commonly below 85° C.) since most photopolymerizable reactions are mildly exothermic. Care must be taken in the selection of colorants, fillers or other additives in order to insure that these materials do not alter the rate of polymerization of the irradiated areas or affect the absorbition or refraction of the actinic radiation. Whereas, one must consider carefully how each component (filler, colorant, plasticizer, stabilizer, polymerization catalyst, polymerization inhibitor, polymerizable material) used in the polymerizable composition will affect photopolymerization, the components used in thermal polymerizable compositions are not as critical since the rate of polymerization can be adjusted by suitable choice of temperature and length of time at elevated temperature. Further, the prior art photopolymerization processes generally require special care or conditioning in order to avoid the inhibiting effect of oxygen on photopolymerization.

The prior art processes are also generally unsuitable for applying a reagent, having an insolubilizing effect, such as a tanning agent or crosslinker, or a solubilizing effect, such as an enzyme or dry etchant to a layer in a predetermined pattern.

The principal object of this invention is to provide a new method of imparting a predetermined decorative or functional pattern to an object or substrate. A more specific object of this invention is to provide a method of carrying out a predetermined chemical reaction on the surface of an object or substrate, where said predetermined chemical reaction is not controlled directly by actinic radiation. Other objects will appear hereinafter.

In the description that follows, the phrase "powder-receptive, solid, light-sensitive organic layer" is used to describe an organic layer which is capable of developing a predetermined contrast or reflection density ($R_d$) upon exposure to actinic light and embedment of black powder particles of a predetermined size in a single stratum at the surface of said organic layer. While explained in greater detail below, the $R_d$ of a light-sensitive layer is a photometric measurement of the difference in degree of blackness of undeveloped areas and black powder developed areas. The terms "physically embedded" or "physical force" are used to indicate that the powder particle is subject to an external force other than, or in addition to, either electrostatic force or gravitational force resulting from dusting or sprinkling powder particles on a substrate. The terms "mechanically embedded" or "mechanical force" are used to indicate that the powder particle is subjected to a manual or machine force, such as lateral to-and-fro or circular rubbing or scrubbing action. The term "embedded" is used to indicate that the powder particle displaces at least a portion of the light-sensitive layer and is held in the depression so created, i.e. at least a portion of each particle is below the surface of the light-sensitive layer. The term "complementary reagent" refers to a material or component which, in minor proportion, exerts a major influence on the course of a predetermined chemical reaction.

The objects of this invention can be attained by coating a first solid layer comprising a composition capable of undergoing a predetermined chemical reaction with a light-sensitive layer capable of developing an $R_d$ of 0.2 to 2.2, preferably 0.4 to 2.0, exposing said light-sensitive layer to actinic radiation to develop a potential $R_d$ of 0.2 to 2.2 without initiating said predetermined chemical reaction, developing said light-sensitive layer with powder particles comprising a component which, in minor proportion, exerts a major influence on the course of said predetermined chemical reaction and carrying out said predetermined chemical reaction in or at the surface of said first layer in a configuration conforming to the image-wise configuration of powder particles of said second layer.

In effect, my invention takes advantage of the facts that (1) there are many materials which, although present in minor proportions, have a major effect on the course of a predetermined chemical reaction, (2) these materials can be deposited in powder form in image-wise configuration on a layer and (3) these materials which are essentially catalytic, can be utilized to selectively control the predetermined chemical reaction in a configuration corresponding to the configuration of the powder particles.

Broadly speaking, the compositions capable of undergoing a predetermined chemical reaction of this invention can be divided into two types. One type contains all the chemicals necessary to carry out said predetermined chemical reaction while the other lacks one or more chemicals necessary to carry out said predetermined chemical reaction. For example, with the first type, the powder particles of the second layer can contain an inhibitor of the predetermined chemical reaction, while with the second type, the powder particles contain the complementary chemicals necessary to carry out said predetermined chemical reaction. In general, the first type of predetermined chemical reaction results in the formation of an image or pattern on the first layer which is a negative of the predetermined image-wise configuration of the powder particles of the second layer. The second type of predetermined chemical reaction can lead to images, which are either positives or negatives of the predetermined image-wise configuration of the powder particles of the second layer. For example, negative images of the powder particles of the second layer are formed when the predetermined chemical reaction is a degradative reaction (undegraded areas remain where there are no powder particles) while positive images of the powder particles of the second layer are formed when the predetermined chemical reaction is a hardening reaction.

In a typical situation where the predetermined chemical reaction is a polymerization reaction, either a positive or negative of the powder particle image of the second layer can be formed by use of powder particles comprising polymerization catalyst (or component thereof) or inhibitor. When the powder particles comprise a polymerization inhibitor, the polymerized areas correspond to a negative of the image-wise configuration of the powder particles of the second layer. On the other hand, when the powder particles comprise a polymerization initiator, the polymerized areas correspond to a positive of the image-wise configuration of the powder particles of the second layer.

For example, where a predetermined chemical reaction of the first type is performed, a thermally polymerizable composition comprising all of the components necessary to carry out said thermal polymerization are deposited in a first layer on the surface of the substrate to be imaged or decorated. The first layer is coated with a second layer capable of developing an $R_d$ of 0.2 to 2.2 without initiating said predetermined chemical reaction, the second layer is exposed to actinic radiation in image-wise configuration to develop a potential $R_d$ of 0.2 to 2.2 without initiating said predetermined chemical reaction and then developed with a powder comprising a polymerization inhibitor. In a preferred method of operation, the layer comprising the polymerization inhibitor is treated with vapors of material which is a solvent for the polymerization inhibitor and a swelling agent for one or more components of said predetermined chemical reaction thereby imbibing the polymerization inhibitor into the layer capable of undergoing said predetermined chemical reaction and then the composition is thermally polymerized at a suitable temperature. Polymerization occurs at the surface of the first layer in the areas where there is no polymerization inhibitor resulting in the formation of a polymeric pattern which is a negative of the image-wise configuration of powder inhibitor of the second layer.

In the second type of situation, a polymerizable composition containing all of the ingredients necessary to carry out said predetermined chemical reaction, except the polymerization catalyst, or component thereof, are deposited on the surface of the substrate. This first layer is coated with a light-sensitive layer capable of developing an $R_d$ of 0.2 to 2.2, without initiating said predetermined chemical reaction, the second layer is exposed to actinic radiation in image-wise configuration to develop a potential $R_d$ of 0.2 to 2.2 without initiating said predetermined chemical reaction and then developed with a powder comprising a suitable polymerization catalyst. In a preferred method of operation, the layer comprising the polymerization catalyst is treated with vapors of a material which is a solvent for said polymerization catalyst and a swelling agent for one or more components of said predetermined chemical reaction, thereby imbibing the catalyst into the layer capable of undergoing said predetermined chemical reaction. Polymerization may initiate as the catalyst imbibes into the polymerizable layer or may be delayed until the application of heat. In either case, polymerization occurs only in the areas conforming to the image-wise configuration of the polymerization catalyst on the surface of the second layer and a polymeric positive pattern of the second layer is formed. By suitable choice of polymerization catalyst or inhibitor, it is possible to obtain various desirable structural patterns without employing light-sensitive polymerizable compositions.

It is readily apparent that the processes of this invention can be advantageously employed to regulate and control numerous predetermined chemical reactions on the surface of an object or a substrate. Set forth below is a brief list of classes of compositions capable of undergoing a predetermined chemical reaction and complementary reagent for either controlling said predetermined chemical reaction or for completing the composition undergoing said predetermined chemical reaction, which can be employed in the process of this invention:

| Composition capable of undergoing predetermined chemical reaction | Complementary reagent |
|---|---|
| Thermally polymerizable composition capable of polymerization at above 50° C. comprising a polymerizable component or components and catalyst. | Polymerization inhibitor. |
| Polymerizable composition comprising a polymerizable component or components lacking polymerization catalyst or component of the catalyst. | Polymerization catalyst or component of the catalyst. |
| Polymeric material | Cross-linker or tanning agent for said polymeric material. |
| Degradable film or foil | Appropriate agent capable of degrading said film or foil. |
| Hydrophilic colloid and inactive enzyme which is capable of degrading hydrophilic colloids. | Material capable of providing proper environment for activating said enzyme. |

As indicated above, the process of this invention comprises (1) exposing an element comprising (A) a first solid layer comprising a composition capable of undergoing a predetermined chemical reaction bearing (B) a second layer comprising a composition capable of developing a $R_d$ of 0.2 to 2.2 to actinic radiation to develop a potential $R_d$ of 0.2 to 2.2 without initiating said predetermined chemical reaction, (2) developing said light-sensitive layer with powder particles comprising a component which, in minor proportion, exerts a major influence on the course of said predetermined chemical reaction and (3) carrying out said predetermined chemical reaction in a configuration conforming to the image-wise configuration of the powder particles of said second layer.

LAYER CAPABLE OF UNDERGOING PREDETERMINED CHEMICAL REACTION

The layer comprising a composition capable of undergoing a predetermined chemical reaction can be produced in numerous ways. The layer capable of undergoing a predetermined chemical reaction can be produced in film or sheet form by any suitable means, such as by coating or extrusion and laminated to a suitable object, or employed as a free film or sheet, such as in the case of metal or plastic films, foils and sheets. For example, the layer can be formed by coating the composition on a suitable substrate (glass, metal, ceramic, paper, plastic, etc.) by any suitable means dictated by the nature of the material (hot-metal, draw down, spray, roller coating or air knife, flow, dip or whirler coating, curtain coating, extrusion as a hot melt or thin film, etc.) to produce a reasonably smooth layer on the substrate or object.

The substrates or objects to be coated with the layer comprising a composition capable of undergoing a predetermined chemical reaction are preferably relatively smooth. The supports can be opaque or transparent. Suitable substrates include materials, such as steel and aluminum plates, sheets and foils, glass, paper, cellulose esters, such as cellulose acetate, cellulose propionate, cellulose butyrate, etc., regenerated cellulose, surface hydrolyzed cellulose acetate, polyethylene terephthalate, nylon, polystyrene, polyethylene, polypropylene, corona discharge treated polyethylene or polypropylene, Tedlar PVF (polyvinyl fluoride), polyvinyl alcohol, amylose, ceramic, etc. If desired, the supports or objects can be subbed with various other materials of the types employed as substrates or supports.

As indicated above, there are a wide number of compositions capable of undergoing a predetermined chemical reaction and complimentary reagents for controlling said predetermined chemical reactions suitable for use in the process of this invention. For example, various free-radical addition polymerization reactions can be controlled by the use of complimentary reagents, such as (1) polymerization inhibitors, (2) polymerization catalysts, (3) components of redox catalyst systems (accelerators or reducing agents) and (4) polymerizable monomers, etc.

Typically, each of the free-radical polymerizable compositions suitable for use in this invention will contain from about 10 to 99.99% by weight of one or more of the following components:

(a) polymeric material and ethylenically unsaturated monomer,
(b) polymerizable polymeric material containing homopolymerizable groups,
(c) polymerizable monomeric material containing homopolymerizable groups or partially polymerized monomeric material, and
(d) highly viscous monomeric and/or polymeric material containing internal copolymerizable ethylenic double bonds and no readily homopolymerizable ethylenically unsaturated double bonds, etc.

Compositions of types (a), (b) or (c) can be controlled with (1) polymerization inhibitors (in which case the polymerizable material should be thermally stable below 50° C.),
(2) polymerization catalysts, and
(3) components of a redox system and/or accelerator.

Compositions of type (d) can be controlled by complementary reagents comprising monomers containing terminal ethylenic double bonds (in which case the polymeric material or monomeric material contains a suitable free-radical catalyst). Under appropriate conditions compositions of type (a) and (c), which do not contain polyunsaturated monomers, can be controlled by complementary monomers containing two or more terminal ethylenic double bonds.

Polymerizable compositions of type (a) can include polymers such as polyesters formed by the reaction of polyhydric alcohols, such as polyethylene glycols of the formula $HO(CH_2)_nOH$ wherein $n$ is a whole number from 2 to 10 inclusive and polycarboxylic acids or anhydrides such as hexahydroterephthalic acid, sebacic acid, maleic acid, maleic anhydride, adipic acid, etc.; nylons or polyamides, such as N-methoxymethyl polyhexamethylene adipamide; vinylidene chloride copolymers, such as vinylidene chloride/acrylonitrile; vinylidene chloride/methacrylate, vinylidene chloride/vinyl acetate copolymers, etc.; ethylene/vinyl acetate copolymers; cellulose or starch ethers, such as methyl cellulose, ethyl cellulose, cyanoethyl starch, etc.; polyethylene; synthetic rubbers, such as butadiene/acrylonitrile copolymers, chloro - 2 - butadiene-1,3, polymers, etc.; cellulose and starch esters, such as cellulose acetate, cellulose acetate succinate, cellulose acetate butyrate starch acetate, etc.; polyvinyl esters, such as polyvinyl acetate/acrylate, polyvinyl acetate/methacrylate, polyvinyl acetate, etc.; polyacrylate and alpha-alkyl polyacrylate esters, such as polyacrylate, polymethyl methacrylate, polyethyl methacrylate, etc.; high molecular weight polyethylene oxides or polyalkylene glycols having average molecular weights from about 4,000 to 10,000 and higher; polyvinyl chloride homopolymers and copolymers, such as polyvinyl chloride/acetate, etc.; polyvinyl acetals, such as polyvinyl butyral, polyvinyl formal, etc.; polyformaldehydes; polyurethanes; polycarbonates; polystyrenes; etc.

Suitable addition polymerizable ethylenically unsaturated compounds which can be used with the above-described polymers in composition (a) include styrene, vinyl toluene, alkyl meth(acrylates), such as methyl methacrylates, ethyl acrylate or hydroxyethyl methacrylate, alkylene or polyalkylene glycol diacrylates prepared from an alkylene glycol of 2 to 15 carbons or a polyalkylene ether glycol of 1 to 10 ether linkages, unsaturated esters of polyols, particularly such esters of the alpha-methylene carboxylic acids, such as ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, the bis-acrylates and methacrylates of polyethylene glycols of molecular weight 200–500, and the like; unsaturated amides, particularly those of the alpha-methylene carboxylic acids, and especially those of alpha,omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, di(alpha-methacrylamidopropoxy) ethane, beta-methacrylamidoethyl methacrylate, N-(beta-hydroxyethyl)-beta-(methacrylamido) ethyl acrylate and N,N-di(beta-methacrylyloxyethyl) acrylamide; vinyl and allyl esters such as divinyl succinate, divinyl adipate, divinyl phthalate, diallyl phthalate, divinyl terephthalate, divinyl benzene-1,3-disulfonate and divinyl butane-1,4-disulfonate; unsaturated aldehydes, such as sorbaldehyde (hexadienal), etc.

Polymerizable compositions of type (b) include polyvinyl cinnamate, cellulose cinnamate, copolymers of vinyl cinnamate and other copolymerizable ethylenically unsaturated monomers, allyl starch or cellulose, polyallyl methacrylate, etc.

Polymerizable compositions of type (c) include monomeric compositions containing one or more polymerizable monomers of the type suitable for use in polymerizable compositions of type (a) and/or suitable for use as complementary reagents for cross-linking polymers containing only copolymerizable internally ethylenically unsaturated double bonds of type (d).

Polymerizable compositions of type (d) include polyesters of alpha,beta-ethylenically unsaturated alpha,beta-dicarboxylic acids (maleic acid, maleic anhydride, fumaric acid) and polyhydric alcohols, vicinal acryloxyhydroxy and vicinal acryloxy-halo long chain compounds having a carboxyl group esterified with a monohydroxy group on the beta carbon atom of the acryloxy group of the type described in U.S. Pats. 3,190,899, 3,304,315, and 3,337,-588.

The above polymerizable compositions can contain fillers, dyes and/or pigments, such as titanium dioxide, colloidal carbon, graphite, phosphor particles, clays, fiber glass, silica, sand, metal powders such as aluminum, copper, magnetic iron, etc.

As indicated above, the degradation and insolubilization of colloids can be controlled by the use of complementary reagents. For example, the degradation of hydrophilic colloids in layer form can be controlled by the use of (1) enzymes, (2) buffering agents, (3) salts having a high water of hydration, (4) acidic or alkaline materials, etc. The tanning or insolubilization of colloids can be controlled by treatment with suitable tanning or cross-linking agents.

Typical degradable hydrophilic colloids include animal proteins, such as gelatin, glue and casein or vegetable proteins, such as soybean, pea, bean, corn, cotton seed and potato, which can be controlled by proteases; polysaccharides, particularly starches which may be native starches, modified starches or low D.S. (degree of substitution) starches, such as native corn starch, tapioca starch, rice starch, waxy corn starch, potato starch, wheat starch, amylose and amylopectin fractions of starches, starches previously modified by treatment with enzymes, hypochlorites or acid, derivatives such as starch acetates, carboxymethyl starch, hydroxyethyl starch, hydroxypropyl starch, etc., that can be controlled by carbohydrases, pectins, gum arabic, collagens, etc.

Mixtures of the degradable hydrophilic colloids and enzymes capable of degrading the hydrophilic colloid can be controlled by deposition of buffering agents which establish the proper pH for optimum utilization of enzyme or by salts having a high water of hydration, to provide the necessary medium for the reaction. If desired, the degradation of hydrophilic organic films, such as starches, or metallic films or foils can be controlled by the deposition of acidic or alkaline materials which are capable of degrading the hydrophilic organic material or metallic surface.

Natural or synthetic polymers can be hardened and/or insolubilized by treatment with suitable tanning or cross-linking agents for the colloid. The insolubilization of synthetic polymers having free reactive groups such as hydroxyl groups, carboxyl groups, amino or amido groups, etc., can be controlled with appropriate reactive cross-linking or tanning agents. To some extent, the complementary agents will depend upon the particular colloid employed. Suitable polymers include hydroxyl containing polymers including polyvinyl alcohol, hydroxyethyl cellulose, copolymers of allyl alcohol and ethylenically unsaturated comonomers, starches, etc.; carboxyl polymers such as carboxymethyl cellulose, copolymers of alpha, beta-ethylenically unsaturated carboxylic acids (methacrylic acid, acrylic acid, maleic anhydride) and ethylenically unsaturated comonomers (styrene, acrylate esters, methacrylate esters, acrylonitrile, etc.), gum arabic, etc.; amido or amino containing polymers such as gelatin, copolymers of alpha, beta-ethylenically unsaturated amides (acrylamide, methacrylamide, etc.) and ethylenically unsaturated comonomers (styrene, alkyl esters of alpha, beta-ethylenically un-saturated acids), polyethyleneimine, etc.

Any of the above compositions capable of undergoing a predetermined chemical reaction can contain suitable fillers, dyes and/or pigments, such as titanium dioxide, colloidal carbon, graphite, phosphor particles, clays, fiber glass, silica, sand, metal powders such as aluminum, copper, magnetic iron, etc., polymeric particles such as polyvinyl acetate, rice starch, etc.

DEPOSITION OF POWDER PARTICLES IN IMAGE-WISE CONFIGURATION

The complementary reagents suitable for use in this invention are deposited on the layer capable of undergoing a predetermined chemical reaction by powder embedment imaging of the type described and claimed in copending commonly assigned application, Ser. No. 796,847, filed Feb. 5, 1969, which has matured into U.S. Pat. 3,637,385.

In powder embedment imaging, as employed in this invention, a light-sensitive organic layer capable of developing a $R_d$ of 0.2 to 2.2, preferably 0.4 to 2.0, is exposed to actinic radiation in image-receiving manner to establish a potential $R_d$ of 0.2 to 2.2; free flowing powder particles comprising said complementary component, which, in minor proportion, exerts a major influence on the course of said predetermined chemical reaction having a diameter, along at least one axis of at least about 0.3 micron but less than 25 times the thickness of said organic layer are applied to said layer of said organic material while the layer of organic material is at a temperature below the melting point of the powder particles and of the organic layer; the powder particles are embedded as a monolayer in a stratum at the surface of said light-sensitive layer to yield an image having portions varying in density in proportion to the exposure of each portion; and non-embedded particles are removed from said organic layer, to develop a powder particle image comprising a component, which, in minor proportion, exerts a major influence on the course of said predetermined chemical reaction. This method of depositing complementary reagent provides a method of carefully controlling the amount of complementary reagent deposited on the surface of the layer capable of undergoing said predetermined chemical reaction. For example, the amount of complementary reagent can be carefully regulated by diluting the complementary reagent with a suitably inert material or carrier or by regulating the particle size of the developing powder. Further, unlike other powder development processes, which are incapable of regulating the number of parts developer deposited per unit area, the present method is susceptible of very careful control since only a monolayer of developing powder is deposited in the light-sensitive layer. Accordingly, the amount of complementary reagent delivered to the layer capable of undergoing said predetermined chemical reaction can be carefully regulated.

This method of depositing powder particles in image-wise configuration makes use of the phenomena that thin layers of many organic materials, some in substantially their naturally occurring or manufactured forms and others including additives to control their powder receptivity or sensitivity to actinic radiation, can have surface properties that can be varied within a critical range by exposure to actinic radiation between a particle-receptive condition and a particle-non-receptive condition. As explained below, the particle-receptivity and particle-non-receptivity of the solid thin layers are dependent on the size of the particles, the thickness of the solid thin layer and the development conditions, such as layer temperature.

Broadly speaking, this method of forming powder images comprising a component which, in minor proportions, exerts a major influence on the course of said predetermined chemical reaction, differs from known methods of forming powder images in various subtle and unobvious ways. For example, the powder particles are not merely dusted on, but instead are applied against the surface of the light-sensitive organic layer under moderate physical force after exposing the light-sensitive layer to actinic radiation. The relatively soft or particle-receptive nature of the light-sensitive layer is such that substantially a monolayer of powder particles, or isolated small agglomerates of a predetermined size, are at least partially embedded at the surface of the light-sensitive layer by moderate physical force. The surface condition in the particle receptive area is at most only slightly soft but not fluid as in prior processes. The relatively hard or particle non-receptive condition of the light-sensitive surface in the non-image areas is such that when powder particles of a predetermined size are applied under the same moderate physical force few, if any, are embedded sufficiently to resist removal by moderate dislodging action such as blowing air against the surface. Any particles remaining in the non-image areas are removed readily by rubbing a soft pad over the surface. In this way, the developed images and subsequently controlled predetermined chemical reactions are characterized by permitting or initiating the predetermined chemical reaction in proportion to the amount of actinic radiation applied to the light-sensitive organic layer.

For use in this invention, the solid, light-sensitive organic layer, which can be an organic material in its naturally occurring or manufactured form or a mixture of said organic material with plasticizers and/or photoactivators for adjusting the powder receptivity and sensitivity to actinic radiation, must be capable of developing a predetermined contrast or $R_d$ using a suitable black developing powder under the conditions of development. The powder-receptive areas of the layer (unexposed areas of a positive-acting, light-sensitive material or the exposed areas of a negative-acting, light-sensitive material) must have a softness such that suitable particles can be embedded into a stratum at the surface of the light-sensitive layer by mild physical forces. However, the layer should be sufficiently hard that film transparencies can be pressed against the surface without the surfaces sticking together or being damaged even when heated slightly under high intensity light irradiation. The film should also have a degree of toughness so that it maintains its integrity during development. If the $R_d$ of the light-sensitive layer is below about 0.2, the light-sensitive layer is too hard to accept a suitable concentration of powder particles. On the other hand, if the $R_d$ is above about 2.2, the light-sensitive layer is so soft that it is difficult to maintain film integrity during physical development and the layer tends to adhere to transparencies precluding the use of vacuum frame or contact exposure equipment. Further, if the $R_d$ is above 2.2, the light-sensitive layer is so soft that more than one layer of powder particles may be deposited with attendant loss of image fidelity (and control of the predetermined chemical reaction) and the layer may be displaced by mechanical forces resulting in distortion or destruction of the image. Accordingly, for use in this invention the light-sensitive layer must be capable of developing a $R_d$ within the range of 0.2 to 2.2 or preferably 0.4 to 2.0, using a suitable black developing powder under the conditions of development.

The $R_d$ of a positive-acting, light-sensitive layer, which is called $R_{dp}$, is a photometric measurement of the reflection density of a black-powder developed light-sensitive layer after a positive-acting, light-sensitive layer has been exposed to sufficient actinic radiation to convert the exposed areas into a substantially powder-non-receptive state (clear the background). The $R_d$ of a negative-acting, light-sensitive layer, which is called $R_{dn}$, is a photometric measurement of the reflection density of a black-powder developed area, after a negative-acting, light-sensitive layer has been exposed to sufficient actinic radiation to convert the exposed area into a powder-receptive area.

In somewhat greater detail, the reflection density of a solid, positive-acting, light-sensitive layer ($R_{dp}$), is determined by coating the light-sensitive layer on a white substrate, exposing the light-sensitive layer to sufficient actinic radiation image-wise to clear the background of the solid, positive-acting, light-sensitive layer, applying a black power (prepared from 77% Pliolite VTL and 23% Neo Spectra carbon black in the manner described below) to the exposed layer, physically embedding said black powder under the conditions of development as a monolayer in a stratum at the surface of said light-sensitive layer and removing the non-embedded particles from said light-sensitive layer. The developed organic layer containing black powder embedded image areas and substantially powder free non-image areas is placed in a standard photometer having a scale reading from 0 to 100% reflection of incident light or an equivalent density scale, such as on Model 500 A photometer of the Photovolt Corporation. The instrument is zeroed (0 density; 100% reflectance) on a powder free non-image area of the light-sensitive organic layer and an average $R_d$ reading is determined from the powder developed area. The reflection density is a measure of the degree of blackness of the developed surface which is relatable to the concentration of particles per unit area. The reflection density of a solid, negative-acting, light-sensitive layer ($R_{dn}$) is determined in the same manner except that the negative-acting, light-sensitive layer is exposed to sufficient actinic radiation to convert the exposed area into a powder-receptive area. If the $R_d$ under the conditions of development is between 0.2 (63.1% reflectance) and 2.2 (0.63% reflectance), or preferably between 0.4 (39.8% reflectance) and 2.0 (1.0% reflectance), the solid, light-sensitive organic material deposited in a layer is suitable for use in this invention.

Although the $R_d$ of all light-sensitive layers is determined by using the aforesaid black developing powder and a white substrate, the $R_d$ is only a measure of the suitability of a light-sensitive layer for use in this invention.

Since the $R_d$ of any light-sensitive layer is dependent on numerous factors other than the chemical constitution of the light-sensitive layer, the light-sensitive layer is best defined in terms of its $R_d$ under the development condition of intended use. The positive-acting, solid, light-sensitive organic layers useful in this invention must be powder-receptive in the sense that the aforesaid black developing powder can be embedded as a monoparticles layer into a stratum at the surface of the unexposed layer to yield a $R_{dp}$ of 0.2 to 2.2 (0.4 to 2.0 preferably) under the predetermined conditions of development and light-sensitive in the sense that upon exposure to actinic radiation the most exposed areas can be converted into the non-particle receptive state (background cleared) under the predetermined conditions of development. In other words, the positive-acting, light-sensitive layer must contain a certain inherent powder receptivity and light-sensitivity. The positive-acting, light-sensitive layers are apparently converted into the powder-non-receptive state by a light-catalyzed hardening action, such as photopolymerization, photocrosslinking, photooxidation, etc. Some of these photohardening reactions are dependent on the presence of oxygen, such as the photooxidation of internally ethylenically unsaturated acids and esters while others are inhibited by the presence of oxygen, such as those based on the photoploymerization of vinylidene or polyvinylidene monomers alone or together with polymeric materials. The latter requires special precautions, such as storage in oxygen-free atmosphere or oxygen-impermeable cover sheets. For this reason, it is preferable to use solid, positive-acting, film-forming, organic materials containing no terminal ethylenic unsaturation.

The negative-acting, solid, light-sensitive organic layers useful in this invention must be light-sensitive in the sense that, upon exposure to actinic radiation, the most exposed areas of the light-sensitive layer are converted from a non-powder-receptive state under the predetermined conditions of development to a powder-receptive state under the predetermined conditions of development. In other words, the negative-acting, light-sensitive layer must have a certain minimum light-sensitivity and potential powder receptivity. The negative-acting, light-sensitive layers are apparently converted into the powder-receptive state by a light-catalyzed softening action, such as photodepolymerization.

In general, the positive-acting, solid, light-sensitive layers useful in this invention comprise a film-forming organic material in its naturally occurring or manufactured form or a mixture of said organic material with plasticizers and/or photoactivators for adjusting powder receptivity and sensitivity to actinic radiation. Suitable positive-acting, film-forming organic materials, which are not inhibited by oxygen, include internally ethylenically unsaturated acids, such as abietic acid, rosin acids, partially hydrogenated rosin acids, such as those sold under the name Staybelite resin, wood rosin, etc., esters of internally ethylenically unsaturated acids, methylol amides of maleated oils such as described in U.S. Pat. 3,471,466, phosphatides of the class described in application Ser. No. 796,841, filed on Feb. 5, 1969, now U.S. Pat. 3,585,031 in the name of Hayes, such as soybean lecithin, partially hydrogenated lecithin, dilinolenyl-alpha-lecithin, etc., partially hydrogenated rosin acid esters, such as those sold under the name Staybelite ester, rosin modified alkyds, etc.; polymers of ethylenically unsaturated monomers, such as vinyltoluene-alpha methyl styrene copolymers, polyvinyl cinnamate, polyethyl methacrylate, vinyl acetate-vinyl stearate copolymers, polyvinyl pyrrolidone, etc.; coal tar resins such as coumarone-indene-resins, etc.; halogenated hydrocarbons, such as chlorinated waxes, chlorinated polyethylene, etc. Positive-acting, light-sensitive materials, which are inhibited by oxygen include mixtures of polymers, such as polyethylene terephthalate/sebacate, or cellulose acetate or acetate/butyrate, with polyunsaturated vinylidene monomers, such as ethylene glycol diacrylate or dimethacrylate, tetraethylene glycol diacrylate or dimethacrylate, etc.

Although numerous positive-acting, film-forming organic materials have the requisite light-sensitivity and powder-receptivity at predetermined development temperatures, it is generally preferable to compound the film-forming organic material with photoactivator(s) and/or plasticizer(s) to import optimum powder-receptivity and light-sensitivity to the light-sensitive layer. In most cases, the light-sensitivity of an element can be increased many fold by incorporation of a suitable photoactivator capable of producing free-radicals, which catalyze the light-sensitive reaction and reduce the amount of photons necessary to yield the desired physical change.

Suitable photoactivators capable of producing free-radicals include benzil, benzoin, Michlers ketone, diacetyl, phenanthraquinone, p-dimethylaminobenzoin, 7,8-benzoflavone, trinitrofluorenone, desoxybenzoin, 2,3-pentanedione, dibenzylketone, nitroisatin, di(6-dimethylamino-3-pyradil)methane, metal naphthanates, N-methyl-N-phenylbenzylamine, pyridil, 5,7-dichloroisatin, azodisisobutyronitrile, trinitroanisole, chlorophyll, isatin, bromoisatin, etc. These compounds can be used in a concentration of .001 to 2 times the weight of the film-forming organic material (.1%–200% the weight of film former). As in most catalytic systems, the best photoactivator and optimum concentration thereof is dependent upon the film-forming organic material. Some photoactivators respond better with one type of film former and may be useful with substantially all film formers in wide concentration ranges.

The acyloin and vicinal diketone photoactivators, particularly benzil and benzoin are preferred. Benzoin and benzil are effective over wide concentration ranges with substantially all film-forming light-sensitive organic materials. Benzoin and benzil have the additional advantage that they have a plasticizing or softening effect on film-forming light-sensitive layers, thereby increasing the powder-receptivity of the light-sensitive layers. When employed as a photoactivator, benzil should preferably comprise at least 1% by weight of the film-forming organic material (.01 times the film former weight).

Dyes, optical brighteners and light absorbers can be used alone or preferably in conjunction with the aforesaid free-radical producing photoactivators (primary photoactivators) to increase the light-sensitivity of the light-sensitive layers of this invention by converting light rays into light rays of longer lengths. For convenience, these secondary photoactivators (dyes, optical brighteners and light absorbers) are called "superphotoactivators." Suitable dyes, optical brighteners and light absorbers include 4-methyl-7-dimethylaminocoumarin, Calcofluor yellow HEB (preparation described in U.S. Pat. 2,415,373), Calcofluor white SB super 30080, Calcofluor, Uvitex W conc., Uvitex TXS conc., Uvitex RS (described in Textil-Rundschau 8 [1953], 339), Uvitex WGS conc., Uvitex K, Uvitex CF conc., Uvitex W (described in Textil-Rundschau 8 [1953], 340), Aclarat 8678, Blancophor OS, Tenopol UNPL, MDAC S–8844, Uvinul 400, Thilflavin TGN conc., Aniline yellow-S (low conc.), Seto flavine T 5506–140, Auramine O, Calcozine yellow OX, Calcofluor RW, Calcofluor GAC, Acetosol yellow 2 RLS–PHF, Eosine bluish, Chinoline yellow-P conc., Ceniline yellow S (high conc.). Anthracene blue Violet fluorescence, Calcofluor white MR, Tenopol PCR, Uvitex GS, Acid-yellow-T-supra, Acetosol yellow 5 GLS, Calcocid OR, Y, Ex. Conc., diphenyl brilliant flavine 7 GFF, Resoflorm fluorescent yellow 3 GPI, Eosin yellowish. Thiazole fluorescor G, Pyrazalone organe YB–3, and National FD&C yellow. Individual superphotoactivators may respond better with one type of light-sensitive organic film former and photoactivator than with others. Further, some photoactivators function better with certain classes of brighteners, dyes and light absorbers. For the most part, the most advantageous combinations of these materials and proportions can be determined by simple experimentation.

As indicated above, plasticizers can be used to impart optimum powder-receptivity to the light-sensitive layer. With the exception of lecithin, most of the film-forming light-sensitive organic materials useful in this invention are not powder-receptive at room temperature but are powder-receptive above room temperature. Accordingly, it is desirable to add sufficient plasticizer to impart room temperature (15 to 30° C.) or ambient temperature powder-receptivity to the light-sensitive layers and/or broaden the $R_{dp}$ range of the light-sensitive layers.

While various softening agents, such as dimethyl siloxanes, dimethyl phthalate, glycerol, vegetable oils, etc. can be used as plasticizers, benzil and benzoin are preferred since, as pointed out above, these materials have the additional advantage that they increase the light-sensitivity of the film-forming organic material. As plasticizer-photoacitvators, benzoin and benzil are preferably used in a concentration of 1% to 80% by weight of the film-forming solid organic material.

The preferred positive-acting, light-sensitive film formers containing no conjugated terminal ethylenic unsaturation include the esters and acids of internally ethylenically unsaturated acids, particularly the phosphatides, rosin acids, partially hydrogenated rosin acids and the partially hydrogenated rosin esters. These materials, when compounded with suitable photoactivators, preferably acyloins or vicinal diketones together with superphotoactivators, require less than 2 minutes exposure to clear the background of light-sensitive layers.

In general, the negative-acting, light-sensitive layers useful in this invention comprise a film-forming organic material in its naturally occurring or manufactured form, or a mixture of said organic material with plasticizers and/or photoactivators for adjusting powder-receptivity and sensitivity to actinic radiation. Suitable negative-acting film-forming organic materials include n-benzyl linoleamide, dilinoleyl-alpha-lecithin, castor wax (glycerol 12-hydroxy-stearate), ethylene glycol monohydroxy stearate, polyisobutylene, polyvinyl stearate, etc. Of these, castor wax and other hydrogenated ricinoleic acid esters (hydroxystearate) are preferred. These materials can be compounded with plasticizers and/or photoactivators in the same manner as the positive-acting, light-sensitive film-forming organic materials.

Some solid light-sensitive organic film formers can be used to prepare either positive or negative-acting, light-sensitive layers. For example, a poly(n-butyl methacrylate) layer containing 20 percent benzoin (20 parts by weight benzoin per 100 parts by weight polymer) yields good positive-acting images. Increasing the benzoin level to 100 percent converts the poly(n-butyl methacrylate) layer into a good negative-acting system.

The light-sensitive layers are formed by applying a thin layer of solid, light-sensitive film-forming organic material having a potential $R_d$ of 0.2 to 2.2 to the layer comprising said composition capable of undergoing a predetermined chemical reaction by any suitable means dictated by the nature of the film-forming organic material and/or the layer comprising said composition capable of undergoing a predetermined chemical reaction (hot melt draw down, spray, roller coating or air knife, flow, dip or whirler coating, curtain coating, etc.) so as to produce a reasonably smooth homogeneous layer of from 0.1 to 40 microns thick. The particular method of application of the light-sensitive layer depends in part upon the chemical nature of the composition capable of undergoing a predetermined chemical reaction since the light-sensitive layer must be deposited without initiating said predetermined chemical reaction and without contaminating said lower layer. For the most part, it is desirable to apply the light-sensitive film-forming organic material from a non-solvent for the composition capable of undergoing a predetermined chemical reaction or by laminating said preformed light-sensitive layer to said layer capable of undergoing a predetermined chemical reaction. If desired, a temporary or semi-permeable isolating layer can be used to separate the light-sensitive layer from the layer capable of undergoing said predetermined chemical reaction.

The light-sensitive layer must be at least 0.1 micron thick and preferably at least 0.4 micron in order to hold suitable powders during development. If the light-sensitive layer is less than 0.1 micron, or the developing powder diameter is more than 25 times layer thickness, the light-sensitive layer does not hold powder with the tenacity necessary to form a permanent record. In general, as layer thickness increases, the light-sensitive layer is capable of holding larger particles. However, as the light-sensitive layer thickness increases, it becomes increasingly difficult to maintain film integrity during development. Accordingly, the light-sensitive layer must be from 0.1 to 40 microns, preferably from 0.4 to 10 microns, with 0.5 to 2.5 microns being best.

The light-sensitive organic layer capable of developing a $R_d$ of 0.2 to 2.2, preferably 0.4 to 2.0, is exposed to actiic radiation in image-receiving manner to establish a potential $R_d$ of 0.2 to 2.2 without initiating said predetermined chemical reaction. In the preferred aspects of this invention, the composition capable of undergoing said predetermined chemical reaction is substantially inert to actinic radiation required by the light-sensitive layer employed. Moreover, the composition capable of undergoing said predetermined chemical reaction preferably lacks one or more components necessary to take part in said prederimned chemical reaction or requires heat or some other treatment to initiate said predetermined chemical reaction. In other cases, such as where a light-sensitive composition capable of undergoing a predetermined chemical reaction is employed (such as a two-component diazotype or heat developable diazotype) the two layers should be selected in a manner such that they respond to actinic radiation at substantially different and non-overlapping wave lengths or a light screen capable of absorbing any radiation capable of initiating said predetermined chemical reaction should be interposed between the two light-sensitive layers or the light source.

After the light-sensitive layer capable of developing a $R_d$ of 0.2 to 2.2 is exposed to actinic radiation in image-receiving manner for a time sufficient to clear the background of a positive-acting layer or establish a potential $R_{dn}$ of 0.2 to 2.2; a suitable developing powder comprising a component which, in minor proportion, exerts a major influence on the course of said predetemined chemical reaction having a diameter along at least one axis of at least about 0.3 micron is applied physically with a suitable force to embed the powder in said light-sensitive layer. The developing powder can be virtually any shape, such as spherical, acicular, platelets, etc.

The developing powder comprising a component which, in minor proportion, exerts a major influence on the course of said predetermined chemical reaction, can be applied in a substantially pure form, if a solid at development temperature, or on a suitable carrier. Carriers, such as resinous or polymeric materials, clay (bentonite), metallic oxides, etc., can be employed to regulate the concentration of the complementary reagent to be applied or, in the case of a liquid complementary reagent, permit the application of the liquid complementary reagent to the light-sensitive layer in powder form. The complementary reagent, if solid, can be ball-milled with carrier in order to coat the carrier with complementary reagent, or, if desired, blended above the melting point of fusible or resinous carriers, ground to a suitable size and classified. In general, a liquid complementary reagent can be absorbed on the surface of a suitable solid carrier or encapsulated in suitable carrier. In some cases, it is advantageous to dissolve carrier and complementary reagent (solid or liquid) in a mutual solvent, dry and grind to suitable size. The developing powder can contain from about 0.1 to 100% by weight complementary reagent and correspondingly 99.9 to 0% by weight carrier.

As indicated above, a wide variety of chemicals can be employed as complementary reagents in the process of this invention. Suitable free-radical catalysts useful for controlling free-radical polymerization reactions include inorganic peroxides, organic peroxides and hydroperoxides. These include hydrogen peroxide, diisopropylbenzene hydroperoxide, cumene hydroperoxide, caproyl peroxide, methylethyl ketone peroide, ammonium or potassium persulfates, etc. Other free-radical catalysts are also useful, such as azodiisobutyronitrile and other aliphatic azo compounds of the type having an acylic azo group and an aliphatic cabon atom on each nitrogen, at least one of which is tertiary. If desired, various anionic, cationic or charge-transfer catalysts can be employed. For example, sodium methalate can be used to initiate cyanoacrylates. In part, the particular catalyst employed depends upon the ethylenically unsaturated monomer and/or other polymerizable materials employed in the predetermined chemical reaction.

Suitable promoters which can be employed as part of a "redox system" for controlling free-radical polymerization reaction include ascorbic acid, soluble sulfites, hydrosulfites, sulfoxalates, thiosulfates, bisulfites, such as sodium hydrosulfite, sodium metabisulfites, zinc or sodium formaldehyde sulfoxalate, calcium bisulfite, etc. Other redox components include polyvalent metal ions, such as ferrous ammonium sulfate, etc. Various other accelerators, such as tertiary amines (dimethylaniline), etc., can be employed as promoters.

Suitable polymerization inhibitors for controlling free-radical polymerization reactions include aromatic hydroxy containing compounds such as hydroquinone, p-methoxyphenol, catechol, tertiary butyl catechol, tertiary butyl hydroquinone, etc.; copper powder, cuprous chloride, phenothiazine, dinitrobenzene, Methylene Blue, naphthylamine, p-phenylenediamine, etc.

Ethylenically unsaturated monomers suitable for use as complementary reagents for cross-linking polymers containing only copolymerizable internally ethylenically unsaturated double bonds include alkyl esters of alpha, beta-ethylenically unsaturated monocarboxylic acids containing from 1 to 18 carbon atoms in the alkyl group, such as methyl acryalte, ethyl acrylate, 2-ethylhexyl acrylate, methyl methacrylate, and ethyl alpha-cyanoacrylate, etc.; alpha, beta-ethylenically unsaturated acids, such as acrylic acid, methacrylic acid and itaconic acid; alpha, beta-ethylenically unsaturated nitriles, such as acrylonitrile, methacryllonitrile and ethacrylonitrile; alpha, beta-ethylenically unsaturated amides, such as methacrylamide, diacetone acrylamide and acrylamide; monovinyl aromatics such as styrene and vinyl toluene, vinyl halides, such as vinyl chloride and vinyl bromide; diesters of alpha, beta-ethylenically unsaturated dicarboxylic acids, such as dimethyl itaconate; alkyl vinyl ethers, such as methyl vinyl ether and ethyl vinyl ether; alkyl vinyl ketones, such as methyl vinyl ketone, etc.; polyethylenically unsaturated monomers, such as allyl crotonate, allyl acrylate, polyhydric alcohol esters of alpha, beta-ethylenically unsaturated monocarboxylic acids, such as 1,3-butylene dimethacrylate, the diacrylate or dimethacrylate of glycol, diethylene glycol, triethylene glycol, etc.

Complementary reagents suitable for use as curing agents for various polymerizable materials include epoxy resin curing agents, such as maleic anhydride, sodium hydroxide, polyamines, etc.; polyurethane and bischloroformate curing agents such as polyamines (ethylene diamine) hydroxyamines (ethanolamine), polyhydric alcohols (sorbitol), etc.

Catalysts suitable for use as complementary reagents in condensation reactions include catalysts for polyisocyanate reactions, such as tertiary amines, quaternary amines, organotin compounds, etc.; boron trifluoride etherate for epoxy resins, etc.

Enzymes suitable for use as complementary reagents for degrading hydrophilic colloids include proteases, pectinases, collagenases, lipases, alpha-amylase, beta-amylase, amylo - 1,4-glucosidase, amylo-1,6-glucosidase, isoamylase, R-enzyme, etc.

Etchants suitable for use as complementary reagents for degrading films and foils include ferric chloride, tartaric acid, oxalic acid, citric acid, etc.

Suitable materials for buffering enzymatic compositions at a suitable pH include sodium carbonate, calcium phosphate, ferric chloride, oxalic acid, tartaric acid, citric acid, etc.

Suitable materials for use as complementary reagents having a high water of hydration include sodium phosphates, such as dibasic sodium phosphate heptahydrate and dodecahydrate, sodium sulfate decahydrate, etc.

Cross-linking agents suitable for use as complementary reagents include aldehydes, such as paraformaldehyde, trioxane, acrolein, glutaraldehyde, hydroxyadipaldehyde, glyoxal, etc.; light-sensitive tanning agents such as ammonium or potassium dichromate; anhydrides such as maleic anhydride, itaconic anhydride, cyclic adipic anhydride, succinic anhydride; water soluble metal salts, such as calcium chloride, ammonium zirconyl carbonate, zinc ammonium carbonate, etc.; epoxides such as diglycidyl ether of Bisphenol A, etc.

Reactive blowing or foaming agents useful as complementary reagents for forming polyurethanes include azo compounds, such as benzene diazonium chloride, p-morpholino-2,4-dibutoxybenzene diazonium chloride; ammonium salts, such as ammonium bicarbonate; salts having a high water of hydration referred to above; azocarbodiimides; etc.

Inhibitors for azocarbodiimide blowing agents, such as barium salts, reducing agents, benzotriazoles, can be used as complementary reagents.

Suitable carriers for the complementary reagents include hydrophilic polymeric carriers, such as polyvinyl alcohol, granular starches (preferably corn or rice), animal glue, gelatin, gum arabic, gum tragacanth, carboxypolymethylene, polyvinyl pyrrolidone, carbowaxes, etc.; hydrophilic monomeric materials, such as sorbitol, mannitol, dextrose, tartaric acid, urea, etc.; hydrophobic carriers, such as polystyrene, Pliolite VTL (butadiene-styrene copolymer), polymethyl methacrylate, inorganic carriers, such as iron oxide, sand, etc.

The particular carrier or carriers employed depend in part on the complementary reagent to be deposited and on the predetermined chemical reaction. In general, the carrier should be selected in a manner to prevent undesirable side reactions between the carrier and complementary reagent or between carrier and components of the predetermined chemical reaction. In some cases, a component of a developing powder can function as an inert carrier and in others as the complementary reagent. For example, sorbitol is an excellent inert diluent carrier for free-radical polymerization inhibitors or enzymes and complementary reagent for curing or extending polyurethane elastomers.

The black developing powder for determining the $R_d$ of a light-sensitive layer is formed by heating about 77% Pliolite VTL (vinyltoluene-butadiene copolymer) and 23% Neo Spectra carbon black at a temperature above the melting point of the resinous carrier, blending on a rubber mill for fifteen minutes and then grinding in a Mikro-atomizer. Commercially available powders such as Xerox 914 Toner, give substantially similar results although tending towards slightly lower $R_d$ values.

The developing powders useful in this invention contain particles having a diameter or dimension along at least one axis from about 0.3 to 40 microns, preferably from 0.5 to 15 microns with powders of the order of 1 to 7 microns being best for light-sensitive layers of 0.4 to 10 microns. Maximum particle size is dependent on the thickness of light-sensitive layer while minimum particle size is independent of layer thickness. Electron microscope studies have shown that developing powders having a diameter 25 times the thickness of the light-sensitive layer cannot be permanently embedded in light-sensitive layers and, generally speaking, best results are obtained where the diameter of the power particle is less than about 10 times the thickness of the light-sensitive layer. For the most part, particles over 40 microns are not detrimental to image development provided the developing powder contains a reasonable concentration of powder particles under 40 microns, which are less than 25 times, and preferably less than 10 times, the light-sensitive layer thickness. However, other things being equal, the larger the developer powder particles (above 10 microns), the lower the $R_d$ of the developed image. For example, when Xerox 914 Toner, classified to contain (a) all particles under 1 micron, (b) 1 to 3 micron particles, (c) 3 to 10 micron particles, (d) 10 to 18 microns and (e) all particles over 18 microns, was used to develop positive-acting 1 micron thick lecithin light-sensitive elements after the same exposure, the images had a $R_{dp}$ of (a) 0.83, (b) 0.95, (c) 0.97, (d) 0.32, and (e) 0.24, respectively.

Although particles over 40 microns are not detrimental to image development, the presence of particles under 0.3 micron diameter along all axes can be detrimental to proper image formation. In general, it is preferable to employ developing powders having substantially all powders having a diameter along at least one axis not less than 0.3 micron, preferably more than 0.5 micron, since particles less than 0.3 micron tend to embed in non-image areas.

As the particle size of the smallest particles increases, less exposure to actinic radiation is required to clear the background. For example, when Xerox 914 Toner, classified to contain (a) all particles under 1 micron, (b) 1 to 3 micron particles, (c) 3 to 10 micron particles, (d) 10 to 18 micron particles and (e) over 18 micron particles, was used to develop the light-exposed portions of positive-acting 1 micron thick lecithin light-sensitive elements, the exposed portions had a $R_{dp}$ of (a) 0.26, (b) 0.23, (c) 0.10, (d) 0 and (e) 0 after equal exposures. By suitably increasing the exposure time, the $R_{dp}$ of the non-image areas was reduced to substantially zero with particles (a), (b) and (c). Other things being equal, the larger the particle size of the developing powder used in this invention, the higher the concentration of complementary reagent available to initiate said predetermined chemical reaction.

In somewhat greater detail, the developing powder is applied directly to the light-sensitive layer, while the powder-receptive areas of said layer are in at most only a slightly soft condition and said layer is at a temperature below the melting point of the layer and powder. The powder is distributed over the area to be developed and physically embedded into the stratum at the surface of the light-sensitive layer, preferably mechanically by force having a lateral component, such as to-and-fro and/ or circular rubbing or scrubbing action using a soft pad, fine brush or even an inflated balloon. If desired, the powder may be applied separately or contained in the pad or brush. The quantity of powder is not critical provided there is an excess available beyond that required for full development of the area, as the development seems to depend primarily on particle-to-particle interaction rather than brush-to-surface or pad-to-surface forces to embed a layer of powder particles substantially one particle thick (monoparticle layer) into a stratum at the surface of the light-sensitive layer. Only a single stratum of powder particles penetrates into the powder-receptive areas of the light-sensitive layer even if the light-sensitive layer is several times thicker than the developer particle diameter. This, of course, makes it possible to carefully control the amount of complementary reagent delivered to the layer capable of undergoing said predetermined chemical reaction.

The pad or brush used for development is critical only to the extent that it should not be so stiff as to scratch or scar the film surface when used with moderate pressure with the preferred amount of powder to develop the film. Ordinary absorbent cotton loosely compressed into a pad about the size of a baseball and weighing about 3 to 6 grams is especially suitable. The developing motion and force applied to the pad during development is not critical. The speed of the swabbing action is not critical other than that it affects the time required, rapid movement requiring less time than slow. The preferred mechanical action involved is essentially the lateral action applied in ultrafine finishing of a wood surface by hand sanding or steel wooling.

Hand swabbing is entirely satisfactory, and when performed under the conditions described above, will reproducibly produce the maximum density which the material is capable of achieving. That is, the maximum concentration of particles per unit area will be deposited under the prescribed conditions, dependent upon the physical properties of the material such as softness, resisliency, plasticity, and cohesivity. Substantially the same results can be achieved using a mechanical device for the powder application. A rotating or rotating and oscillating, cylindrical brush or pad may be used to provide the described brushing action and will produce a substantially similar end result.

After the application of developing powder, excess developing powder remains on the surface which has not been sufficiently embedded into, or attached to, the layer. This may be removed in any convenient way, as by wiping with a clean pad or brush usually using somewhat more force than employed in mechanical development, by vacuuming, by vibrating, or by air doctoring and recovered. For simplicity and uniformity of results, the excess powder usually is blown off using an air gun having an air-line pressure of about 20 to 40 p.s.i. The gun is preferably held at an angle of about 30 to 60 degrees to the surface at a distance of 1 to 12 inches (3 to 8 preferred). The pressure at which the air impinges on the surface is about 0.1 to 3, and preferably about 0.25 to 2, pounds per square inch. Air cleaning may be applied for several seconds or more until no additional loosely held particles are removed. The remaining powder should be sufficiently adherent to resist removal by moderately forceful wiping or other reasonably abrasive action.

After the non-embedded developing powder is removed from the surface of the light-sensitive element, the composition capable of undergoing said predetermined chemical reaction is not in contact with the powder particles comprising the complementary reagent since the light-sensitive layer intervenes. In order to initiate and carry out said predetermined chemical reaction, the complementary reagent must be brought into reactive contact with the composition capable of undergoing said predetermined chemical reaction. This can be accomplished in several ways, such as by transporting the complementary reagent through the light-sensitive layer, or fracturing the light-sensitive layer and transporting the complementary reagent into contact with the composition capable of undergoing said predetermined chemical reaction. For example, the developing element can be treated with vapors of a material, which is a solvent for the complementary reagent and capable of swelling the layer capable of undergoing said predetermined chemical reaction, thereby imbibing the complementary component into said layer capable of undergoing said predetermined chemical reaction. Typically, this can be accomplished by employing vapors of a solvent, such as water, hydrocarbons (hexane, heptane, pentane, etc.), halohydrocarbons (trichloroethylene, 1,1,1-trichloroethane, etc.), alcohols (methanol, ethanol, isopropanol, etc.), ketones (acetone, methyl ethyl ketone, etc.), etc. Alternatively, the element can be heated to a suitable temperature to drive the complementary reagent into said composition capable of undergoing said predetermined chemical reaction or suitable pressure may be employed to accomplish the same results. In some cases, the predetermined chemical reaction is initiated as soon as the complementary reagent comes into contact with the composition capable of undergoing said predetermined chemical reaction. In other cases, it may be necessary to heat the resultant element to a suitable temperature to initiate and carry out said predetermined chemical reaction. Alternatively, the predetermined chemical reaction may be initiated by the application of actinic radiation.

The image areas defined by the completed predetermined chemical reaction are of three types. In those cases where the predetermined chemical reaction is a polymerization reaction, hardening reaction, cross-linking reaction, etc., the image areas defined by the completed predetermined chemical reaction can be characterized as having a harder, less soluble character than the unreacted areas, i.e. the unreacted areas have a lower melting point and greater solubility than the reacted areas. In those cases where the predetermined chemical reaction is a degradation reaction or etching reaction, the image areas defined by the completed predetermined chemical reaction can be characterized as being softer and/or as having a greater solubility than the unreacted areas. In those cases where the predetermined chemical reaction is primarily a color change, the physical characteristics of the image areas defined by the completed predetermined chemical reaction in the non-image areas are of no import.

After the predetermined chemical reaction is completed, the original light-sensitive layer and residual carrier for for the complementary reagent remaining on the surface of the light-sensitive layer, are removed from the surface of the predetermined chemical reaction layer. Preferably, when the predetermined chemical reaction is of the first type (polymerization reaction, hardening or cross-linking reaction) the unreacted non-image areas of the predetermined chemical reaction layer are removed simultaneously with the light-sensitive layer in an appropriate manner to establish usefully defined image areas. Typically, the light-sensitive layer and the unreacted materials of the layer comprising a predetermined chemical reaction layer are removed with a solvent for the unreacted materials or mechanically by abrasion or stratum transfer to a suitable receiving layer. If the predetermined chemical reaction is a degradation reaction or etching reaction, the degradation products, reactants used to form the degradation products and the light-sensitive layer are removed with an appropriate solvent and/or removed mechanically. In this way, usefully defined image areas are formed which can be utilized for forming various types of printing plates, color television tubes, ceramic objects, printed circuits, etc.

The following examples are merely illustrative and should not be construed as limiting the scope of this invention.

EXAMPLE I

This examples illustrates the preparation of a gelatin relief employing a protease enzyme as the complementary reagent. A gelatin coated substrate was prepared by coating a 10% aqueous solution of gelatin on a paper sheet with a wire wrapped rod. The solid gelatin layer was coated with a solution comprising .64 gram Staybelite Ester #10 (partially hydrogenated rosin ester of glycerol), .16 gram benzil and .096 gram 4-methyl-7-dimethylaminocoumarin, dissolved in 100 ml. Chlorothene (1,1,1-trichloroethane), to form a light-sensitive layer. The sensitized side of the element was placed in contact with a positive transparency and exposed to actinic radiation in a vacuum frame for about one minute. The unexposed areas were developed with a protease developing powder, which had been ball-milled for 24 hours. The protease powder was embedded into the unexposed areas of the light-sensitive Staybelite layer by rubbing a wad of cotton over the surface of the element using essentially the same force as employed in the ultrafine finishing of wood. After the non-embedded protease enzyme was removed from the surface of the light-sensitive element, the embedded enzyme was imbibed into the gelatin layer by holding the element over a steam bath. After about 24 hours, the gelatin layer was washed with cold water to dissolve the digested gelatin and remaining protease enzyme. The gelatin relief was a negative of the protease powder image. If desired, the gelatin relief image can be reinforced by dipping in a bath containing a suitable cross-linking or tanning agent.

Essentially the same results are obtained by replacing the Staybelite ester sensitizer composition described above with (1) 1.25 grams Staybelite Ester #5 (partially hydrogenated rosin ester of glycerol), .1875 gram benzil and .3125 gram 4-methyl-7-dimethylaminocoumarin, dissolved in 100 ml. Chlorothene, (2) 1.25 grams Staybelite resin F (partially hydrogenated rosin acids), .1 gram benzil and .3125 gram 4-methyl-7-dimethylaminocoumarin, dissolved in 100 ml. Chlorothene, (3) 1.25 grams wood rosin, .15 gram benzil and .3125 gram 4-methyl-7-dimethylaminocoumarin, dissolved in 100 ml. Chlorothene and (4) 1.25 grams abietic acid, .15 gram benzil and .3125 gram 4-methyl-7-dimethylaminocoumarin, dissolved in 100 ml. Chlorothene.

EXAMPLE II

A positive gelatin relief is obtained by repeating Example I using a trioxane developing powder in place of the protease developing powder, steaming the element to imbibe the trioxane into the gelatin layer, heating the element to cross-link the gelatin and washing the unhardened gelatin out with hot water.

EXAMPLE III

A positive gelatin relief is obtained by repeating Example I using an ammonium dichromate developing powder in place of the protease developing powder, steaming the element to imbibe the ammonium dichromate powder into the gelatin layer, exposing the element to uniform ultraviolet light irradiation to tan the gelatin in the dichromated areas and washing out the untanned gelatin with hot water.

EXAMPLE IV

A negative polysaccharide relief is obtained by repeating Example I using an underivatized amylose coated sheet of paper and an alpha-amylase-beta-amylase developing powder, steaming the element to imbibe the enzymes into the amylose layer, and washing the amylose layer with hot water to dissolve the digested amylose and remaining amylase enzymes.

EXAMPLE V

This example illustrates the use of a polymerization inhibitor to control the free-radical polymerization of an addition polymerizable composition. A polymerizable composition comprising 50 grams Paraplex P 462 (polyester of an alpha, beta-ethylenically unsaturated alpha, beta-dicarboxylic acid and polyhydric alcohol, dissolved in styrene) with 1.5 gram benzoyl peroxide and 5 grams of silica is deposited on an aluminum sheet, air dried to form a solid superficially dry layer, and sensitized by carefully depositing a preformed one micron film of .64 gram Staybelite Ester #10, .16 gram benzil and .096 gram 4-methyl-7-dimethylaminocoumarin. The sensitized layer is exposed to actinic radiation through a positive transparency for about one minute in a vacuum frame and developed by rubbing a wad of cotton containing hydroquinone (the polymerization inhibitor), which had been ball-milled for about 16 hours. The polymerization inhibitor is embedded into the unexposed areas of the light-sensitive layer using essentially the same force as employed in ultrafine finishing of wood and then imbibed into the polymerizable layer by placing the element over a refluxing bath of hexane. The areas in the polyester layer free of hydroquinone are polymerized by placing the element in an oven at 100° C. for one hour. Unpolymerized material and Staybelite sensitizer layer are removed by washing with 1,1,1-trichloroethane.

EXAMPLE VI

This example illustrates the use of a blowing agent inhibitor to control the foaming of a polyvinyl chloride plastisol. A plasticizer polyvinyl chloride sheet, containing 2% by weight of an azocarbodiimide blowing agent (which can conveniently be made by plastisol techniques), on a suitable support, is flow coated with a solution of 0.96 gram Staybelite Ester #10, .24 gram benzil and .144 gram 4-methyl-7-diethylaminocoumarin in 100 ml. Chlorothene, exposed to actinic radiation through a positive transparency for about one minute in a vacuum frame, developed by rubbing a wad of cotton containing hydroquinone (the blowing agent inhibitor) which had been ball-milled for a period of about 16 hours. The foaming agent inhibitor is embedded into the unexposed areas of the light-sensitive layer using essentially the same force as employed in ultrafine finishing of wood and then imbibed into the foamable polyvinyl chloride plastisol layer by placing the element over a steam bath, heating the element above the decomposition temperature of the azocarbodiimide and gelling temperature of the plastisol, and cooling the element to room temperature. The polyvinyl chloride plastisol bears raised areas corresponding to the areas where there is no hydroquinone on the surface of the polyvinyl chloride plastisol.

Essentially the same results are obtained by replacing the hydroquinone complementary reagent with any of the blowing agent inhibitors of U.S. Pat. 3,293,094 or by replacing the azocarbodiimide blowing agent with any of the blowing agents of U.S. Pat. 3,293,094.

EXAMPLE VII

This example illustrates the preparation of a planographic printing plate for use without an aqueous fountain solution, of the type described in U.S. Pat. 3,511,178, wherein a catalyst for the cure of the polysiloxane is deposited by deformation imaging. A planographic printing plate is formed by flow coating a solution of 20 parts by weight of a silicone gum (a high molecular weight polysiloxane such as commercially available "G.E. RTV 108"), and 80 parts by weight of heptane, on a sheet of ungrained aluminum, air drying the element, depositing a light-sensitive one micron film of .64 gram Staybelite Ester #10, .16 gram benzil and .096 4-methyl-7-diethylaminocoumarin on the silicone layer by hot melt coating, exposing the light-sensitive layer to actinic radiation through a positive transparency for about one minute in a vacuum frame, developing with an aluminum octoate polysiloxane catalyst, heating the element at a temperature of about 300 to 400° F. for one to fifteen minutes, removing the Staybelite sensitive layer by flowing Chlorothene over the element, removing the uncured polysiloxane with a solution of two parts by weight n-butyl acetate, five parts by weight n-propyl alcohol and one part by weight water, leaving the cured polysiloxane only in the areas corresponding to the deposited aluminum octoate. This aluminum plate is capable of printing without aqueous fountain solution on a planographic press after thorough rinsing with water and air drying.

Essentially the same results are obtained by replacing the aluminum octoate with aluminum stearate, cadmium naphthanate, etc.

Essentially the same results are obtained by replacing the polysiloxane resin with any of those disclosed as suitable in U.S. Pat. 3,511,178.

Since many embodiments of this invention may be made and since many changes may be made in the embodiments described, the foregoing is interpreted as illustrative only and my invention is defined by the claims appended hereafter.

What is claimed is:

1. The process for carrying out a predetermined chemical reaction in image-wise configuration which comprises:

(1) exposing to actinic radiation in image-receiving manner an element comprising (A) a first solid layer comprising a composition capable of undergoing a predetermined chemical reaction bearing (B) a light-sensitive second layer comprising a composition capable of developing a $R_d$ of 0.2 to 2.2 to develop a potential $R_d$ of 0.2 to 2.2 without initiating said predetermined chemical reaction;

(2) applying to said layer of organic material free-flowing powder particles having a diameter along at least one axis of at least about 0.3 micron but less than 25 times the thickness of said light-sensitive layer, said powder particles comprising a complementary reagent which, in minor proportion, exerts a major influence on the course of said predetermined chemical reaction;

(3) while the layer is at a temperature below the melting point of the powder and of the light-sensitive layer, physically embedding said powder particles as a monolayer in a stratum at the surface of said light-sensitive layer to yield an image having portions varying in density in proportion to the exposure of each portion;

(4) removing non-embedded particles from said layer to develop an image comprising a monolayer of said powder particles, and (5) carrying out said predetermined chemical reaction in a predetermined configuration conforming to the image-wise configuration of the powder particles of said second layer.

2. The process of claim 1, wherein said predetermined chemical reaction is initiated by transporting the complementary reagent through the light-sensitive layer.

3. The process of claim 1, wherein said predetermined chemical reaction is initiated by fracturing the light-sensitive layer and transporting the complementary reagent into contact with the composition capable of undergoing said predetermined chemical reaction.

4. The process of claim 1, wherein said predetermined chemical reaction is a polymerization reaction, said powder particles comprise a polymerization inhibitor and said predetermined chemical reaction produces polymerized areas corresponding to a negative of the image-wise configuration of said powder particles.

5. The process of claim 1, wherein said predetermined chemical reaction is a hardening or cross-linking reaction, said powder particles comprise a complementary reagent capable of initiating said hardening or cross-linking reaction and said predetermined chemical reaction produces hardened or cross-linked areas corresponding to a positive of the image-wise configuration of said powder particles.

6. The process of claim 5, wherein said light-sensitive layer and said unhardened or uncross-linked areas of the composition capable of undergoing said predetermined chemical reaction are removed after said predetermined chemical reaction is completed.

7. The process of claim 1, wherein said predetermined chemical reaction is a degradation reaction, said powder particles comprise a complementary reagent capable of initiating said degradation reaction and said predetermined chemical reaction leaves undegraded areas corresponding to a negative of the image-wise configuration of said powder particles.

8. The process of claim 7, wherein said light-sensitive layer and said degradation products resulting from said predetermined chemical reaction are removed from the element after said predetermined chemical reaction is completed.

9. The process of claim 1, wherein said predetermined chemical reaction is an addition polymerization reaction.

10. The process of claim 9, wherein said powder particles comprise a component of a free-radical polymerization catalyst and said predetermined chemical reaction produces polymerized areas corresponding to a positive of the image-wise configuration of said powder particles.

11. The process of claim 10, wherein said component of a free-radical catalyst is an accelerator.

12. The process of claim 9, wherein said powder particles comprise a free-radical polymerization inhibitor and said predetermined chemical reaction produces polymerized areas corresponding to a negative of the image-wise configuration of said powder particles.

13. The process of claim 9, wherein said powder particles comprise a carrier.

14. The process of claim 7, wherein said powder particles comprise an enzyme.

15. The process of claim 1, wherein said light-sensitive organic material comprises a member selected from the group consisting of internally ethylenically unsaturated acids, internally ethylenically unsaturated esters, halogenated hydrocarbons, and mixtures thereof.

16. The process of claim 15, wherein said organic material comprises a partially hydrogenated rosin acid.

17. The process of claim 15, wherein said organic material comprises a partially hydrogenated rosin ester.

18. The process of claim 15, wherein said organic material comprises a phosphatide.

19. The process of claim 15, wherein said organic material comprises a halogenated hydrocarbon.

20. The process of claim 1, wherein said light-sensitive organic material comprises a polymer of an ethylenically unsaturated monomer.

21. The process for carrying out a predetermined chemical reaction in image-wise configuration which comprises:

(1) exposing an element comprising (A) a first solid layer comprising a composition capable of undergoing a free-radical polymerization reaction bearing (B) a light-sensitive second layer comprising a composition capable of receiving a powder in image-wise configuration to actinic radiation to form a latent powder-receptive image without initiating said free-radical polymerization reaction, (2) developing said latent image with powder particles comprising at least one complementary reagent selected from the group consisting of free-radical polymerization catalyst, free-radical polymerization accelerator and free-radical polymerization inhibitor to form a layer of powder particles in image-wise configuration, (3) bringing said complementary reagent into reactive contact with said composition capable of undergoing said free-radical polymerization reaction, and (4) carrying out said free-radical polymerization reaction in a predetermined configuration conforming to the image-wise configuration of the powder particles of said second layer.

22. The process of claim 21, wherein said free-radical polymerization reaction is initiated by transporting the complementary reagent through the light-sensitive layer.

23. The process of claim 22, wherein said free-radical polymerization reaction is initiated by fracturing the light-sensitive layer and transporting the complementary reagent into contact with the composition capable of undergoing said free-radical polymerization reaction.

References Cited

UNITED STATES PATENTS

| | | | |
|---|---|---|---|
| 3,236,640 | 2/1966 | Tomanek et al. | 96—115 |
| 3,499,781 | 3/1970 | Krueckel | 96—115 |
| 3,060,026 | 10/1962 | Heiart | 96—28 |
| 3,236,647 | 2/1966 | Philpot | 96—34 |
| 2,090,450 | 8/1937 | Kogel | 96—48 |
| 2,297,691 | 10/1942 | Carlson | 96—1 |
| 3,436,215 | 4/1969 | Levinos et al. | 96—35.1 |

NORMAN G. TORCHIN, Primary Examiner

E. C. KIMLIN, Assistant Examiner

U.S. Cl. X.R.

96—35.1, 48, 28, 34